UNITED STATES PATENT OFFICE.

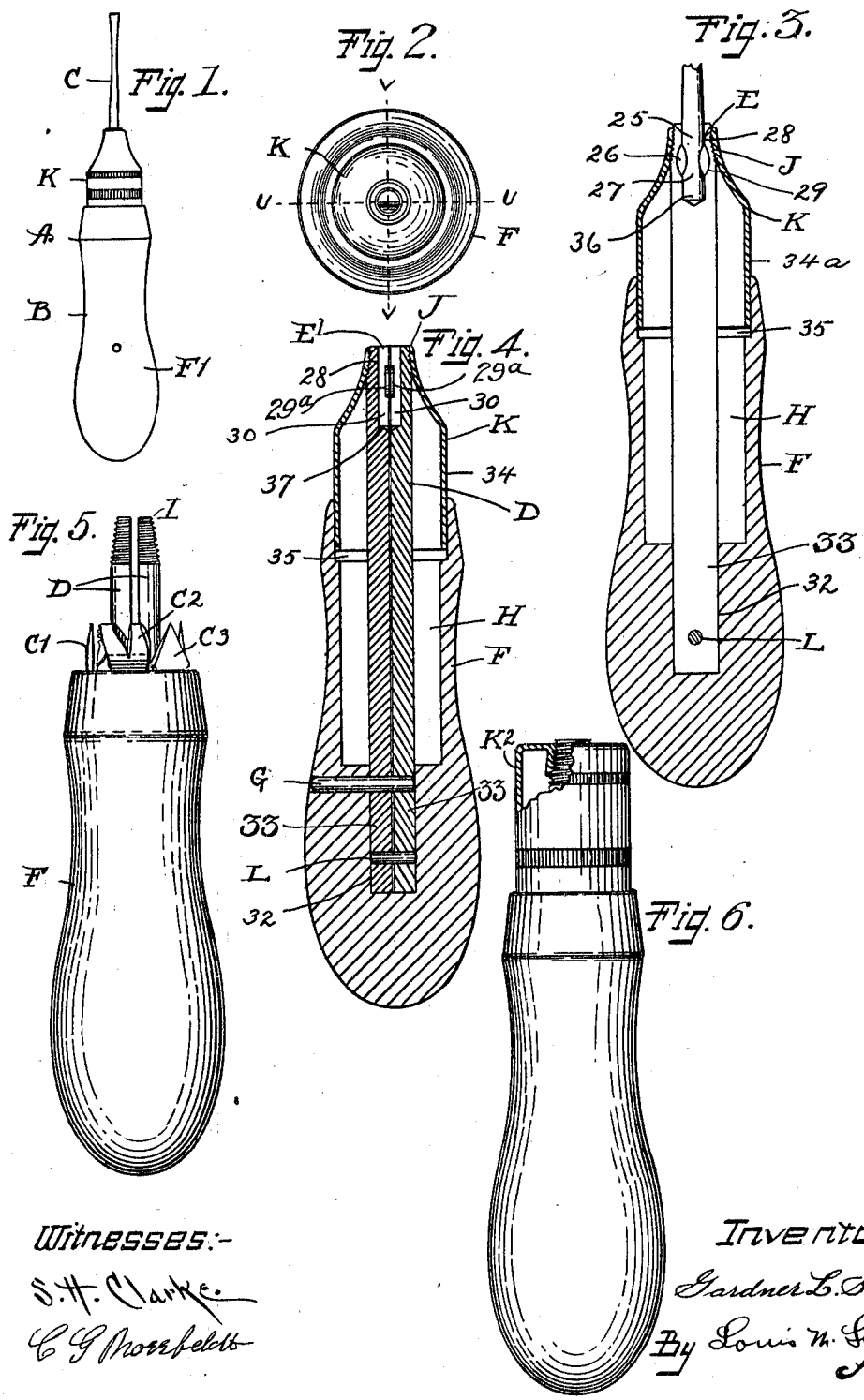

GARDNER L. HOLT, OF HARTFORD, CONNECTICUT.

HANDLE-FASTENING.

1,099,369.  Specification of Letters Patent.  Patented June 9, 1914.

Application filed December 6, 1911. Serial No. 664,269.

*To all whom it may concern:*

Be it known that I, GARDNER L. HOLT, a citizen of the United States, residing at Hartford, in the county of Hartford and State of Connecticut, have invented certain new and useful Improvements in Handle-Fastenings, of which the following is a specification.

My invention relates to improvements in handle fastenings, and the objects of my improvements are simplicity and economy in construction and convenience and efficiency in use.

Figure 1 is a side elevation of my handle fastening provided with a tool magazine. Fig. 2 is a plan view of the same on an enlarged scale. Fig. 3 is a sectional view on the line $u\ u$ of Fig. 2. Fig. 4 is a sectional view on the line $v\ v$ of Fig. 2. Fig. 5 is a side elevation of the same with the locking shell nut member removed, and showing a number of tool blades in the tool chamber or magazine. Fig. 6 is a side elevation in part broken out and in section of a handle fastening embodying my invention and having a modified form of the shell nut.

A is my improved tool and comprises a tool handle B and tool blade C which are separably connected in a manner to be described. The said tool C comprises a shank having a tool bit at the outer end suitable for the work for which the same is to be used and at the inner end provided with a head 25 that is cylindrical for an appreciable portion of its length and has a pair of lateral wings 26 in the form of flanges, of generally uniform thickness and semi-circular formation and formed from the body of the said head 25 by suitable dies, the said wings being located preferably as shown intermediate the length of the cylindrical body portion 27 of the said head 25, and in an axial plane. The said tool handle B is provided with a pair of jaws D having a socket E that is a fit for the said head 25, comprising a cylindrical portion 28 fitting the said cylindrical portion 27 on the head 25 and a pair of recesses 29 fitting the said wings 26, and the tool end 36 bottoming on the end 37 of the socket E. The said jaws D meet along an axial plane coincident with the plane of the wings 26, which plane accordingly divides the said socket E symmetrically into two similar halves, comprising each a semi-cylindrical body portion 30 and a pair of semi-circular lateral recesses 31. The said socket E is located at the tool end of the jaws D and the inner or handle ends 33 of the said jaws D are secured together by being driven into a hole 32 in the handle proper F which hole is a tight fit for the exterior thereof, and a pin G passing through the said jaws D and handle proper F prevents relative rotative and longitudinal movement of the jaws and handle proper. Outwardly from the said inner end 33 and hole 32, the said jaws D have free lateral movement, permitting a sufficient opening at the tool end to admit the tool to the socket E, the said tool end overhanging or projecting beyond the outer end of the handle proper F and intermediate the said outer end and the hole 32 is housed in a cylindrical chamber H which is sufficiently large in diameter to permit of such free movement of the jaws D. The exterior of the tool end of the said jaws D is tapered and threaded to provide a taper thread I, and which is suitable for engaging with the taper thread J on a locking nut K. When the said head 25 is in position in the socket E, screwing the nut K on the thread I serves to secure the tool blade C in the tool handle D. The said nut K may be provided with a sleeve-like extension 34 which serves as a finish for the tool end of the handle, and which sleeve may as shown, fit inside the outer end of the handle proper F.

I find that by suitably enlarging the clearance chamber H in the handle proper F, I provide a chamber suitable for the storage of spare or change tool blades, $C^1$, $C^2$, $C^3$, and which blades are retained in said chamber by a corresponding enlargement of the sleeve portion 34 of the locking nut member K. An enlargement 35 of the outer end of the chamber H may be provided suitably to receive the inner end of the sleeve portion 34 of the locking nut, whereby the said end will be received within the body of the handle proper F.

I prefer to use for making the two jaw members D semi-circular stock in the form of a rod, cut to suitable lengths. The said lengths are placed together with the flat sides in abutment and are pinned together adjacent the inner or handle end by a construction pin L in a manner to prevent relative separation longitudinally and in the axial direction of the pin and to permit relative angular movement on the pin as a pivot to expose the inner or flatted portion of the tool end.

As described, the said jaw members D are united to form a cylindrical body, suitable for having the tool end operated on as a unit, and when so united the said tool end is drilled axially to provide the said cylindrical portion 28 of the socket E and the exterior is tapered and threaded to form the said taper thread I. The jaw members D are next angularly separated at the tool end in the manner described and the lateral semi-circular recesses 29 formed by counterboring as shown in Fig. 3 or milling or the recesses 29$^a$ of the socket E$^1$, formed by milling across the inner face of the jaw members D, as shown in Fig. 4.

As described the pair of jaw members D is completed suitably for receiving the end of the tool member and is next forced into the hole 32 in the handle proper F, after which the handle proper and jaw members are drilled laterally and the pin inserted, which pin G may pass through the entire thickness of the handle proper F or may pass through only one side of the handle proper F, as shown in Fig. 4.

As described the flat faces of the jaw members D are in abutment throughout the entire length, including the portions at the tool ends inclosed by the thread I, and particularly so when the tool member is omitted, and because of this there is no possibility of straining or springing the jaw members by forcibly tightening the locking nut when the tool is so removed.

I prefer to make the jaw members D of relatively appreciable length, whereby the opening and closing of the jaws is readily effected, even when the jaws are made of heavy material and suitable for heavy duty and without any tendency to spring the material, which opening and closing is limited as described to the portion extending to the said hole 32 in the handle proper F.

The chamber H permits of opening and closing of the jaws and at the same time provides a storage chamber for spare tools that permits of storing a considerable number of such tools in a handle proper of comparatively small dimensions.

The special nut K$^2$ shown in Fig. 6 has an annular flat outer end instead of a conical form as shown in the nut K, Fig. 3.

Claim:—

In a tool comprising a handle proper and a pair of jaw members having jaws provided with means for removably securing a tool, the said handle proper comprising a body portion and a hollow cylindrical extension thereof, the said jaw members being secured in the said body portion, and extending through the said extension, and the inner surfaces of the said extension and the outer surfaces of the said jaw members being separated by an annular and open space suitable for housing tools therein.

GARDNER L. HOLT.

Witnesses:
H. T. HOLT,
LOUIS M. SCHMIDT.

---

Copies of this patent may be obtained for five cents each, by addressing the "Commissioner of Patents, Washington, D. C."